United States Patent
Liu (10) Patent No.: US 11,109,153 B2
(45) Date of Patent: Aug. 31, 2021

(54) MICROPHONE APPARATUS AND ELECTRONIC DEVICE HAVING LINEAR MICROPHONE ARRAY WITH NON-UNIFORM CONFIGURATION AND METHOD OF PROCESSING SOUND SIGNAL

(71) Applicant: Wistron Corp., New Taipei (TW)

(72) Inventor: Han Yi Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/689,720

(22) Filed: Nov. 20, 2019

(65) Prior Publication Data

US 2021/0051401 A1     Feb. 18, 2021

(30) Foreign Application Priority Data

Aug. 15, 2019    (TW) ................... 108129047

(51) Int. Cl.
*H04R 3/00*   (2006.01)
*H04R 3/04*   (2006.01)
(Continued)

(52) U.S. Cl.
CPC .............. *H04R 3/005* (2013.01); *G10L 15/22* (2013.01); *G10L 25/18* (2013.01); *H04R 1/406* (2013.01); *H04R 3/04* (2013.01); *H04R 2201/403* (2013.01)

(58) Field of Classification Search
CPC ........ G10L 15/02; G10L 13/02; G10L 15/26; G10L 2015/025; G10L 21/0272; G10L 15/14; G10L 2021/02166; G10L 25/18; G10L 15/065; G10L 15/20; G10L 17/00; G10L 21/0216; G10L 21/028; G10L 25/90; G10L 15/10; G10L 2021/02165; G10L 21/0202; G10L 13/033; G10L 15/08; G10L 15/285; G10L 15/32; G10L 2015/088; G10L 21/0232; G10L 25/78; G10L 25/84;
(Continued)

(56) References Cited

U.S. PATENT DOCUMENTS

| | | | |
|---|---|---|---|
| 4,751,738 A | 6/1988 | Widrow et al. | |
| 5,058,170 A * | 10/1991 | Kanamori | G10K 11/341 381/92 |
| 8,965,002 B2 * | 2/2015 | Oh | G10L 21/0208 381/92 |
| 2003/0063758 A1 * | 4/2003 | Poletti | H04R 3/005 381/91 |

(Continued)

FOREIGN PATENT DOCUMENTS

| CN | 102421050 A | 4/2012 |
|---|---|---|
| TW | M330707 U | 4/2008 |

OTHER PUBLICATIONS

Chinese language office action dated Dec. 2, 2020, issued in application No. TW 108129047.

*Primary Examiner* — Lun-See Lao
(74) *Attorney, Agent, or Firm* — McClure, Qualey & Rodack, LLP (57) ABSTRACT

A microphone apparatus is provided. The microphone apparatus includes a microphone array and an integrated circuit. The microphone array includes at least three microphones arranged in a straight line with a non-uniform configuration. The integrated circuit is electrically connected to the microphone array. The integrated circuit is configured to process a merged sound signal from different combinations of microphones using a time-domain filter to generate an output sound signal. The sound gain of the output sound signal at each sound-receiving angle of each frequency is substantially uniform.

11 Claims, 10 Drawing Sheets

(51) Int. Cl.
*G10L 25/18* (2013.01)
*G10L 15/22* (2006.01)
*H04R 1/40* (2006.01)

(58) Field of Classification Search
CPC ... G10L 15/063; G10L 15/142; G10L 15/183; G10L 19/0212; G10L 21/0224; H04R 3/00; H04R 1/44; H04R 2499/13; H04R 29/00; H04R 3/005; H04M 2201/40; H04M 3/4286; H04W 4/12; H04H 60/45; H04N 21/235; H04N 21/4307; H04N 21/435; H04N 21/44008; H04N 21/482; H04N 21/8126; H04N 21/8547; H04N 7/088; H04N 7/163
USPC .................. 381/92, 94.1–94.5, 122, 163
See application file for complete search history.

(56) References Cited

U.S. PATENT DOCUMENTS

| | | | |
|---|---|---|---|
| 2003/0063759 A1* | 4/2003 | Brennan | H04R 3/005 381/92 |
| 2004/0175006 A1 | 9/2004 | Kim et al. | |
| 2008/0159559 A1* | 7/2008 | Akagi | G10L 21/0208 381/92 |
| 2009/0154728 A1* | 6/2009 | Yuzuriha | H04R 1/406 381/94.7 |
| 2011/0288860 A1* | 11/2011 | Schevciw | G10L 25/78 704/233 |
| 2012/0082322 A1* | 4/2012 | van Waterschoot | H04S 7/30 381/92 |
| 2012/0310646 A1* | 12/2012 | Hu | G10L 15/02 704/238 |
| 2018/0040327 A1* | 2/2018 | Ono | H04R 1/406 |

* cited by examiner

MICROPHONE APPARATUS AND ELECTRONIC DEVICE HAVING LINEAR MICROPHONE ARRAY WITH NON-UNIFORM CONFIGURATION AND METHOD OF PROCESSING SOUND SIGNAL

CROSS REFERENCE TO RELATED APPLICATIONS

This Application claims priority of Taiwan Patent Application No. 108129047 Aug. 15, 2019, the entirety of which is incorporated by reference herein.

BACKGROUND OF THE DISCLOSURE

Field of the Disclosure

The present disclosure relates to a microphone apparatus, and, in particular, to a microphone apparatus and an electronic device having a linear microphone array, and a method of processing a sound signal.

Description of the Related Art

With advents in technology, portable electronic devices, personal computers, and laptops have been widely used, and the demand for products using microphone arrays has also increased. For example, a microphone array may include a plurality of microphones and can be arranged in a predetermined manner to capture sound signals. A conventional microphone array is, for example, a linear microphone array, and each of the microphones in the linear microphone array are arranged in a line at equal intervals.

Figure 5A:
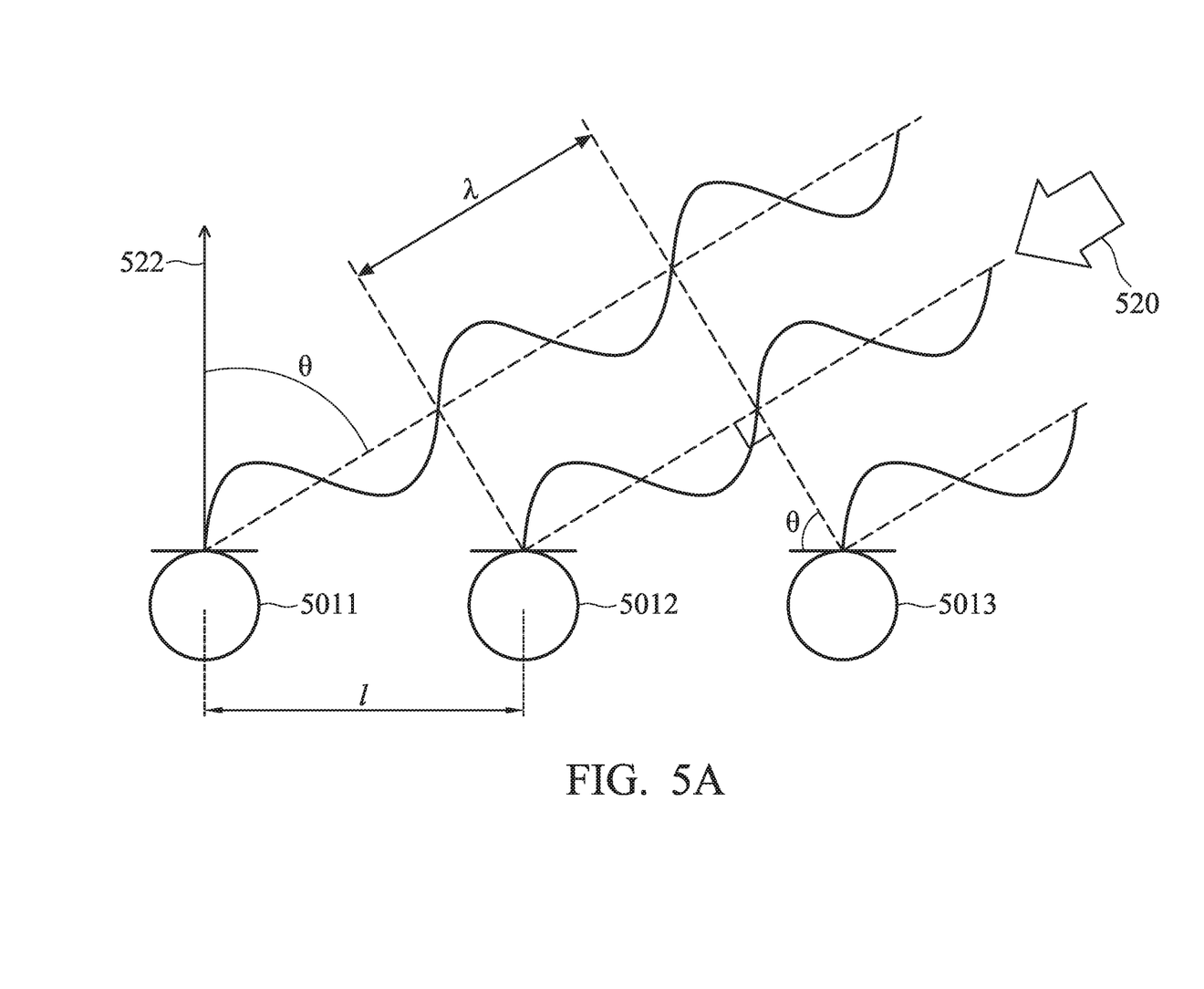
FIG. 5A is a diagram of a linear microphone array arranged at equally spaced intervals.

FIG. 5A is a diagram of a linear microphone array arranged at equally spaced intervals. The microphone array 500, for example, may include N microphones arranged in a line at the same interval (e.g., microphone distance l). For convenience of description, three microphones 5011 to 5013 are shown in FIG. 5A. A sound angle θ is formed between the wavefront 522 of the central axes of the microphones 5011 to 5013. If the speed of sound is c and the frequency of the sound signal is f, the wavelength of the sound signal is λ=c/f, wherein the microphone distance l, and signal-receiving angle, and the sound-signal wavelength λ all affect the intensity of the sound signal received by the microphone array 500. When the microphone array 500 uses N microphones, the output sound signal $A_{out}$ of the microphone array can be expressed by equation (1) which is:

$$A_{out} = \sum_{i=0}^{N-1} e^{\frac{j2\pi f i l \sin(\theta)}{c}} \quad (1)$$

When a microphone array 500 arranged at equal intervals is used, if the frequency of the sound signal is lower, the change in the shape of the sound field is gentler and the sound range is wider, so that it is easy to receive too much ambient sound (noise). If the frequency of the sound signal is higher, the corresponding change in the shape of the sound field is more severe and the sound range is narrowed. When the user moves the position slightly, the quality of the received sound signal becomes worse (e.g., the volume becomes smaller), and the quality of the received sound signal in different frequency bands is inconsistent.

Figure 5B:
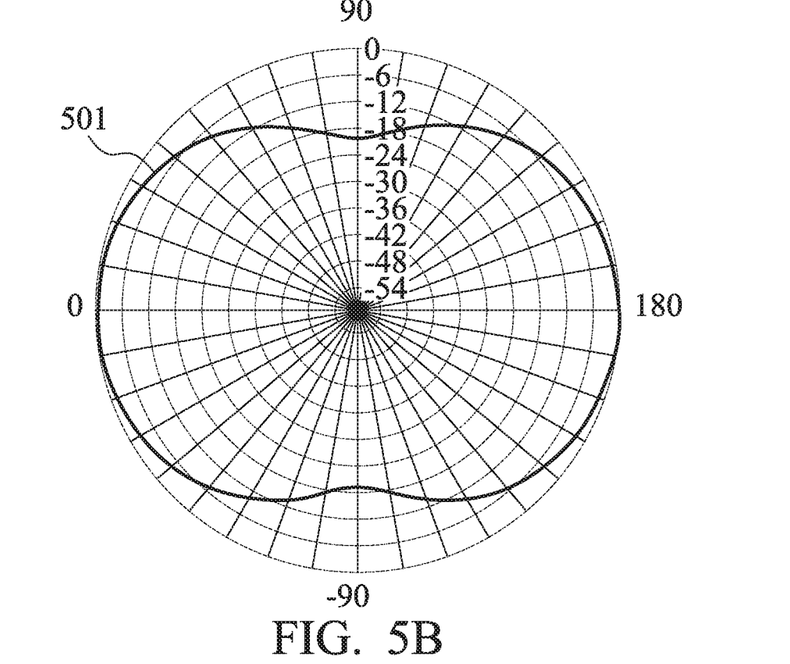
FIGS. 5B and 5C are polar-pattern diagrams of equally spaced linear microphone arrays at different frequencies.
Figure 5C:
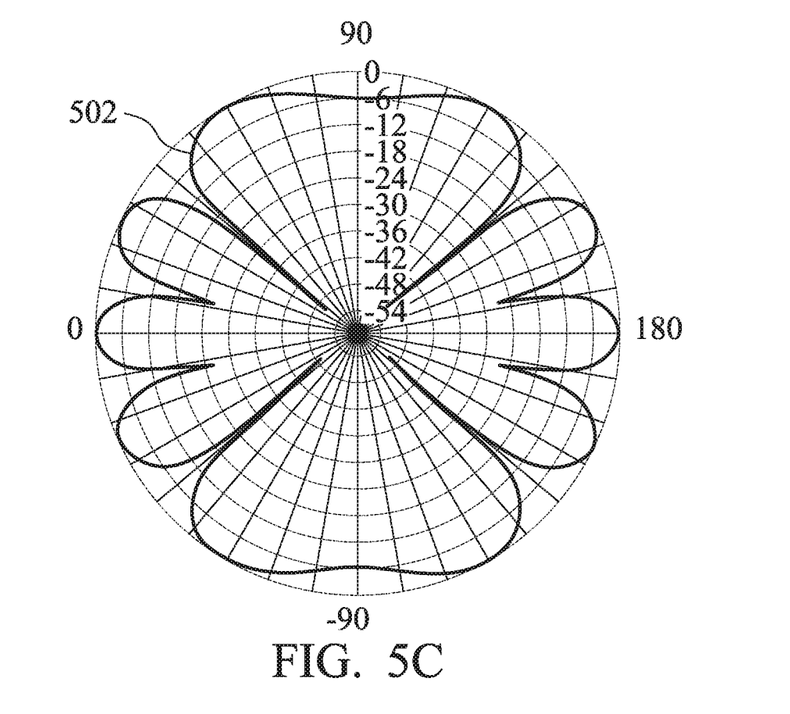

FIGS. 5B and 5C are polar-pattern diagrams of equally spaced linear microphone arrays at different frequencies. In FIGS. 5B and 5C, the number labeled on the outer ring is the sound-receiving angle, where 0 degrees is the direction in which the user's position or the microphone is aligned, and different concentric circles represent, for example, different gain values (in dB). For example, given a microphone distance l of 20 cm, when the sound signal is at a frequency of 800 Hz, the sound field of the microphone array I shaped as shown by curve 501 of FIG. 5B, where a better gain can be obtained within the angular range near the angle of 0 degrees (i.e., the direction of the sound source) and 180 degrees, and a poorer gain that is attenuated by 18 dB can be obtained within the angular range near the angles of 90 degrees and −90 degrees. Similarly, when the sound signal is at a frequency of 4000 Hz, the sound field of the microphone array 500 is shaped as shown by curve 502 in FIG. 5C, where better gains can be obtained within the angular range near the angles of 0 degrees (i.e., user's position), positive and negative 30 degrees, positive and negative 60 degrees, positive and negative 120 degrees, positive and negative 150 degrees, and 180 degrees, and the gain at a number of specific sound-receiving angles is significantly worse. Accordingly, when the sound signal is at the frequency of 4000 Hz, the range in which the microphone array 500 receives the user's voice is very narrow, and a higher proportion of environmental noise is received.

Specifically, the microphone array 500 arranged at equal intervals cannot achieve a balance sound-collecting effect at each sound-receiving angle of different frequencies, thus reducing user experience.

BRIEF SUMMARY OF THE DISCLOSURE

In view of the above, a microphone apparatus and an electronic device having a linear microphone array, and a method of processing a sound signal are provided in the disclosure to solve the aforementioned problems.

In an exemplary embodiment, a microphone apparatus is provided. The microphone apparatus includes: a microphone array and an integrated circuit. The microphone array includes at least three microphones arranged in a straight line with a non-uniform configuration. The integrated circuit is electrically connected to the microphone array. The integrated circuit is configured to process a merged sound signal from different combinations of microphones using a time-domain filter to generate an output sound signal.

In another exemplary embodiment, a method of processing a sound signal is provided. The method includes the following steps: providing a microphone array, wherein the microphone array includes at least three microphones arranged in a straight line with a non-uniform configuration; and processing a merged sound signal from different combinations of microphones using a time-domain filter to generate an output sound signal. The output sound signal is a time-domain sound signal. The sound gain of the output sound signal at each sound-receiving angle of each frequency is substantially uniform.

In yet another exemplary embodiment, an electronic device is provided. The electronic device includes a microphone apparatus and a processor. The microphone apparatus includes a microphone array and an integrated circuit. The microphone array includes at least three microphones arranged in a straight line with a non-uniform configuration. The integrated circuit is electrically connected to the microphone array. The integrated circuit is configured to process a merged sound signal from different combinations of microphones using a time-domain filter to generate an output sound signal. The output sound signal is a time-domain sound signal. The sound gain of the output sound signal at each sound-receiving angle of each frequency is substantially uniform. The processor is electrically connected to the microphone apparatus. The processor is configured to perform a fast Fourier transform (FFT) on the output sound signal to obtain a frequency-domain sound signal for speech recognition.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
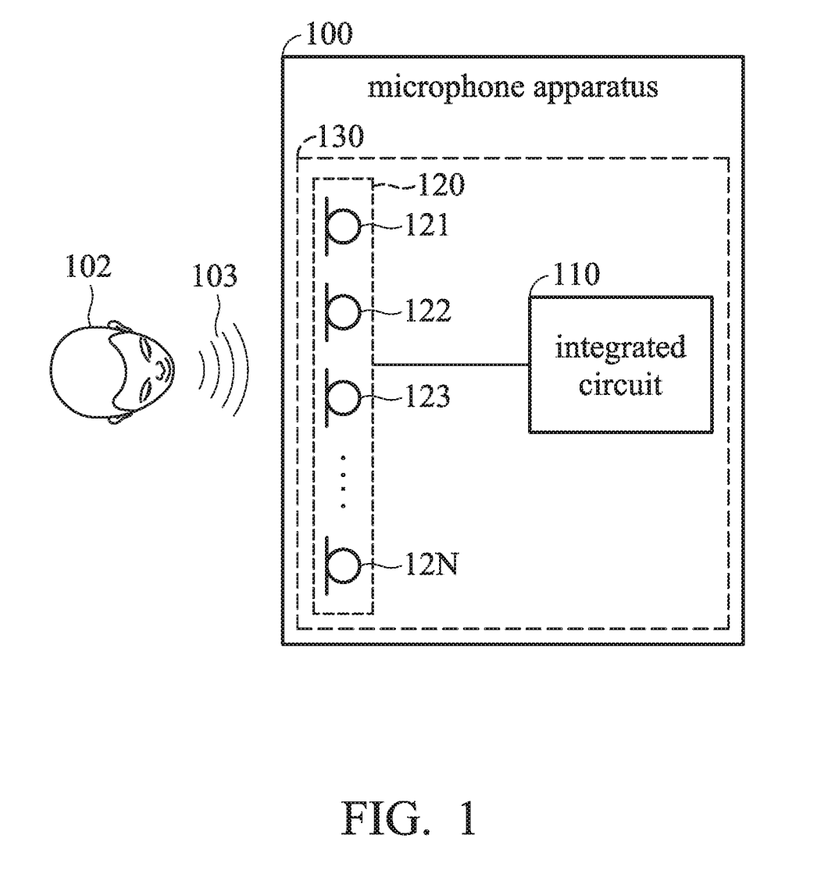
FIG. 1 is a schematic diagram of a microphone apparatus in accordance with an embodiment of the disclosure.

FIG. 1 is a schematic diagram of a microphone apparatus in accordance with an embodiment of the disclosure. The microphone apparatus 100 can be disposed in an electronic device such as a personal computer, a laptop, a display, a server, a portable electronic device, or a set-top box, and is configured to receive a speech signal emitted by a user. The microphone apparatus 100 is further configured to perform a time-domain filtering process on the received speech signal to generate an output acoustic signal, so that the output acoustic signal can have a relatively uniform sound gain at respective sound-receiving angles of different frequencies.

As depicted in FIG. 1, the microphone apparatus 100 may include an integrated circuit 110 and a microphone array 120. The integrated circuit 110 and the microphone array 120 may, for example, be disposed on a circuit board 130. The microphone array 120 may include at least three microphones, such as microphones 121~12N, where N is an integer larger than or equal to 3. The microphones 121~12N are arranged in a line with a non-uniform configuration, and are configured to receive a speech signal 103 emitted by user 102. Each of the microphones 121~12N, for example, may be an omnidirectional microphone and has the same sensitivity. In addition, each of the microphones 121~12N may include a sound amplifier to amplify the sound signal and an analog-to-digital converter (DC) for converting the receiving sound signal into an electrical signal.

In some embodiments, the integrated circuit 110 can be directly connected to and control the microphones 121~12N. In some embodiments, the integrated circuit 110 can be connected to the circuit board 130 through a conductor (or a conducting wire) and coupled to the microphones 121~12N through other conductors, thereby providing voltage to the microphones 121~12N and receiving and then processing the electronic signals generated by the microphones 121~12N.

In some embodiments, the integrated circuit 110 may be an application-specific integrated circuit (ASIC) that includes digital circuitry (e.g., circuits capable of performing digital-signal processing), analog circuitry (e.g., operational amplifiers), or analog-to-digital converters, for example. In some other embodiments, the integrated circuit 110 may be a digital signal processor (DSP), a micro control unit (MCU), or a microprocessor unit (MPU), but the disclosure is not limited thereto.

Figure 2A:
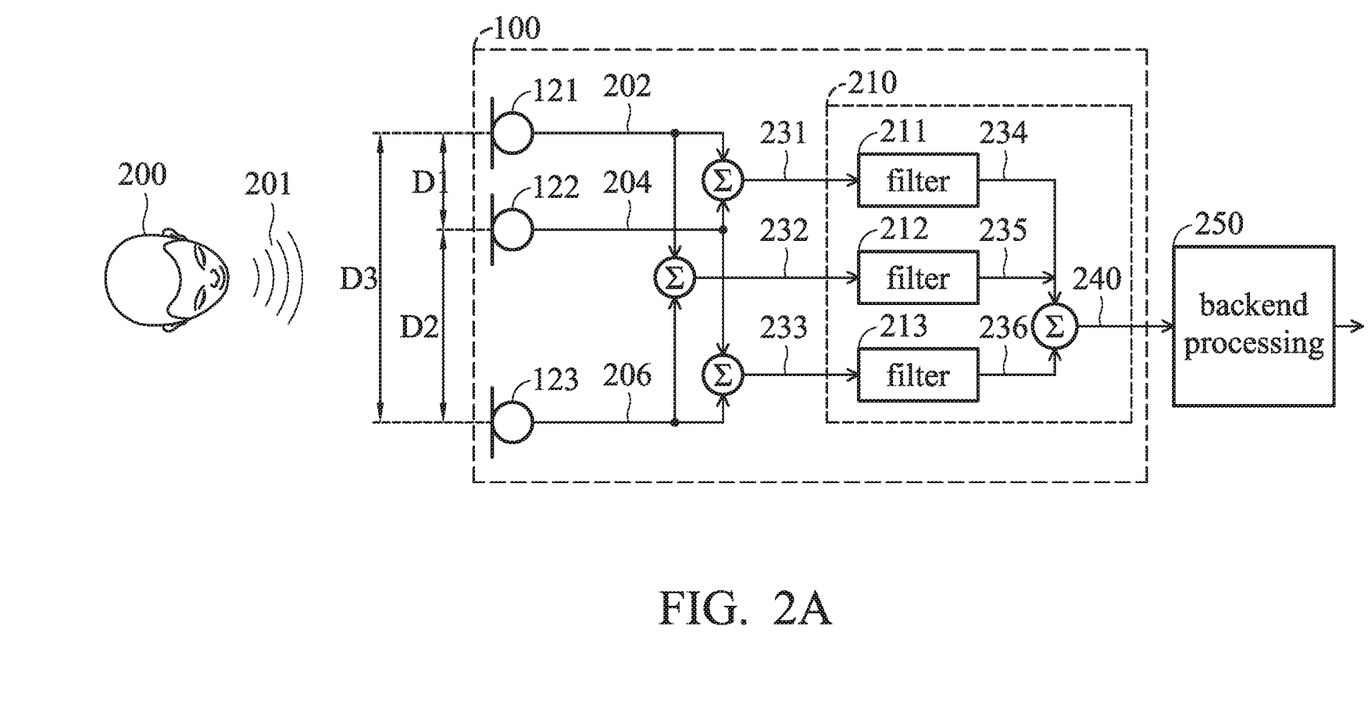
FIG. 2A is a diagram of the acoustic-processing procedure performed by the microphone array in accordance with an embodiment of the disclosure.

FIG. 2A is a diagram of the acoustic-processing procedure performed by the microphone array in accordance with an embodiment of the disclosure. Please refer to FIG. 1 and FIG. 2A.

For convenience of description, in the embodiment of FIG. 2A, the microphone array 120 is implemented by three microphones such as microphones 121~123, and the microphones 121~123 can be disposed on the same plane as the microphone apparatus 100, such as the front surface or the side surface. In addition, the microphones 121~123 are arranged in a line with a non-uniform configuration. For example, the microphone distance between the microphones 121 and 122 is D1, and the microphone distance between the microphones 122 and 123 is D2, and the microphone distance D1 is not equal to the microphone distance D2, as depicted in FIG. 2A. In addition, the microphone distance between the microphones 121 and 123 is D3, and the relationship between the microphone distances D1~D3 is D3>D2>D1. In some embodiments, the microphones distance D1, D2, and D3 may be, for example, 3 cm, 4.5 cm, and 7.5 cm, respectively, but the disclosure is not limited thereto. It should be noted that the microphone distances D1~D3 can be specifically designed for the use of the microphone apparatus 100, but the minimum distance D between two adjacent microphones needs to be free of spatial aliasing, for example, which can be expressed by equation (2):

$$D \leq \frac{\lambda_{min}}{2} \qquad (2)$$

where the minimum wavelength $\lambda_{min}$ of the sound signal occurs, for example, when the sound-receiving angle is 90 degrees, and the minimum wavelength $\lambda_{min}$ corresponds to the maximum frequency $f_{max}$ of the sound signal, such as from 8000 Hz to 15000 Hz. The relationship between the minimum wavelength $\lambda_{min}$ and the maximum frequency $f_{max}$ can be expressed by equation (3):

$$\lambda_{min} = \frac{c}{f_{max}} \quad (3)$$

The sound-receiving angle θ may indicate an inner angle between the wavefront of the sound signal (i.e., the sound-source direction) and the direction aligned by the central axes of the microphones 121, 122, and 123. In the embodiment, any two microphones in the microphone array 120 can constitute a microphone array or a microphone pair. Since the microphone distances between the two microphones in each microphone pair in the microphone array 120 are different (e.g., D1, D2, and D3), the frequency of the corresponding sound signal is different for each microphone pair formed by any two microphones.

For example, according to the Nyquist Theorem, the sampling frequency must be at least twice the frequency of the sound signal captured by each microphone pair so as not to cause spatial aliasing. For example, if the distance of the microphone pair is d and the speed of sound is c (e.g., 340 m/s), the maximum frequency $f_0$ without distortion corresponding to the microphone pair can be expressed by equation (4):

$$f_0 \leq \frac{c}{2 \times d} \quad (4)$$

If the distance of the microphone pair is d=5 cm, and the speed of sound is 340 m/s, there will be no spatial aliasing for the sound signal captured by the microphone pair at the frequency of 3400 Hz or below.

When the user 200 emits a speech signal 201, the microphones 121~123 may receive the speech signal 201 and generate the sound signals 202, 204, 206, respectively, wherein the sound signals 202 and 204 are merged to obtain the sound signal 231, and the sound signals 202 and 206 are merged to obtain the sound signal 232, and the sound signals 204 and 206 are merged to obtain the sound signal 233. The sound signals 231, 232, and 233 are respectively transmitted to the filters 211, 212, and 213, wherein the filters 211, 212, and 213 are respectively a high-pass filter, a low-pass filter, and a band-pass filter in the time domain. For example, the aforementioned high-pass filter, low-pass filter, and band-pass filter in the time-domain can be implemented by various filters well known in the art of the disclosure or digital filters with appropriately designed filter coefficients. In some embodiments, the low-pass filter may be, for example, implemented by a sinc filter, a unit box filter, or a unit Gaussian filter in the time domain, but the disclosure is not limited thereto.

The sound signals 231, 232, and 233 are respectively processed by the filters 211, 212, and 213 to obtain the filtered sound signals 234, 235, and 236, and the sound signals 234, 235, and 236 are merged to obtain the output sound signal 240. It should be noted that time-domain sound signals are used in the audio-processing stage 210 of the microphone apparatus 100, and the filtered sound signals 234, 235, and 236 generated by the filters 211, 212, and 213, and the output sound signal 240 transmitted to the backend processing stage are time-domain signals. For example, the input sound signal of each filter in the microphone apparatus 100 can be, for example, expressed as s(t), and the time-domain transfer function of the filter can be expressed as h(t). Accordingly, each filter may perform calculations of time-domain convolution of the input sound signal s(t) and transfer function h(t), and the sound signal generated by each filter is also a time-domain sound signal.

It should be noted that since the microphone apparatus 100 is a frontend device for audio processing, it does not need to have powerful computing capability. Thus, the filters in the microphone apparatus 100 may perform time-domain convolution calculations without consuming excessive system resources and power consumption. The output sound signal 240 of the microphone apparatus 100 is transmitted to the backend processing 250 (e.g., backend processing component in the electronic device) to perform subsequent audio processing, and the backend processing 250 is equipped with a processor with a stronger computing capability to perform "Fast Fourier Transform (FFT)" on the time-domain output sound signal 240 to convert the time-domain output sound signal 240 to a frequency-domain sound signal, and then analyze the frequency-domain sound signal to perform corresponding audio processing, such as recognizing the direction of the sound source, filtering noises, beamforming, speech recognition, etc., but the disclosure is not limited thereto. Generally, a sound signal having a frequency range of 300 to 4000 Hz is sufficient for the backend processing 250 to recognize the speech and content of a particular person.

A person having ordinary knowledge in the art of the disclosure can appreciate that the FFT requires multiplication and integration calculation on the real part and the imaginary part of the input sound signal to obtain the frequency-domain sound signal S(f) which can be expressed by equation (5):

$$S(f) = \int_{-\infty}^{\infty} s(t) \cdot e^{-j2\pi ft} dt \quad (5)$$

If each filter is implemented by a frequency-domain filter, the microphone apparatus needs to perform the FFT on the input sound signal before performing convolution calculations. Since any two microphones can form a microphone array, if a frequency-domain filter is used, an individual FFT operation is required. Accordingly, if frequency-domain filters are used, the total computation amount is quite large and consumes a great amount of system resources, and is not suitable for the microphone apparatus disposed at the frontend of the audio-processing procedure.

In the embodiment of the disclosure, the calculations corresponding to the sound signal generated by each microphone of the microphone apparatus 100 can be performed in the time domain after each microphone receives the speech signal, and the calculations of the microphone apparatus 100 does not need to use the FFT, and thus the amount of calculations can be significantly reduced. In addition, since time-domain filters are use in the microphone apparatus 100 and the output sound signal 240 of the microphone apparatus 100 is also a time-domain sound signal, no matter whether how many microphones are used in the microphone array 120, the backend processing 250 can obtain the frequency-domain sound signal for subsequent analysis and audio processing by performing the FFT once on the output sound signal 240 of the microphone apparatus 100, thereby significantly reducing the number of computations.

Figure 2B:
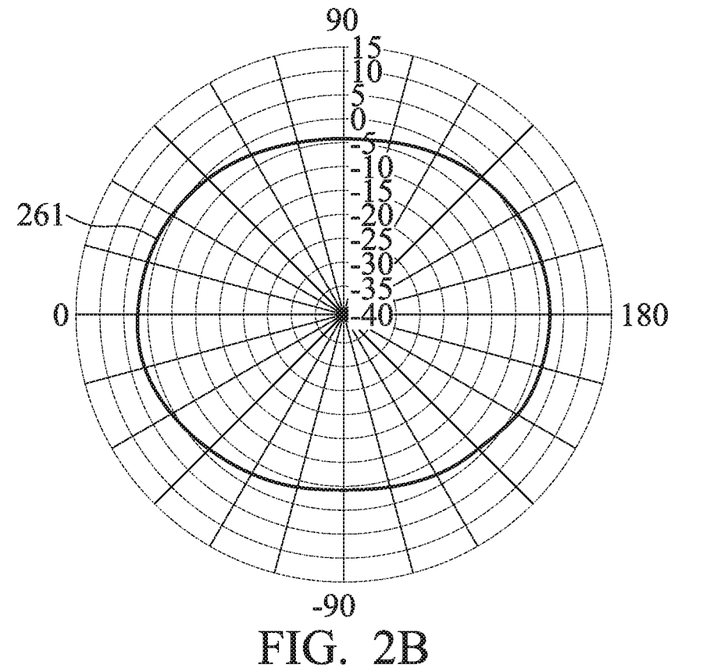
FIGS. 2B and 2C are polar-pattern diagrams at different frequencies in accordance with the embodiment of FIG. 2A.
Figure 2C:
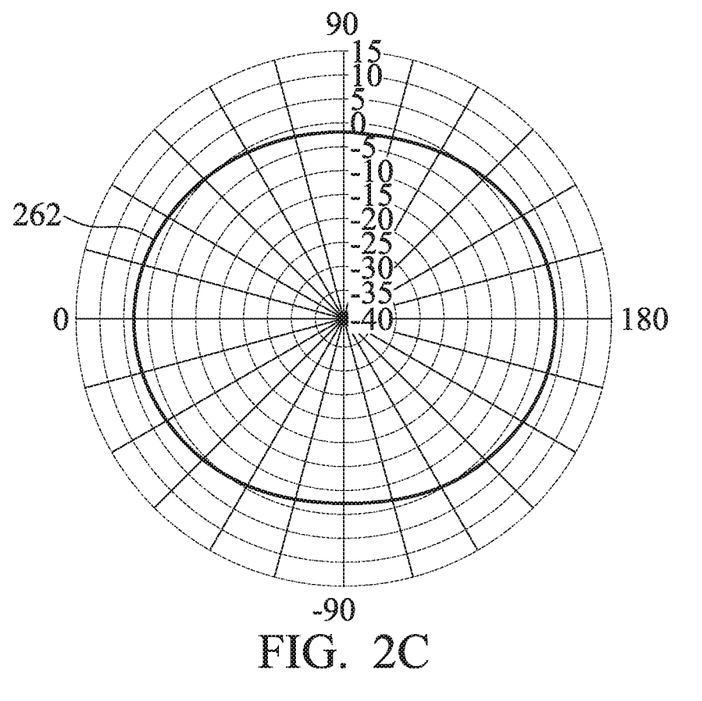

In the embodiment of FIG. 2A, if the output sound signal of the microphone apparatus 100 is analyzed, the polar-pattern diagrams in FIG. 2B and FIG. 2C can be obtained, wherein curve 261 in FIG. 2B corresponds to the sound signal at the frequency of 800 Hz, and curve 262 in FIG. 2C corresponds to the sound signal at the frequency of 4000 Hz.

As depicted in FIG. 2B, when the frequency of the sound signal is 800 Hz, the sound gain at the sound-receiving angles of 0 and 180 degrees is slightly greater than 0 dB, and the sound gain at the sound-receiving angles of plus and minus 90 degrees can be raised to approximately −5 dB. Referring to FIG. 5B again, the sound signal generated by the conventional linear microphone arrays with equal intervals will have severe attenuation of the sound gain at the sound-receiving angles of plus or minus 90 degrees, for example, up to −20 dB. Specifically, as shown by curve 261 in FIG. 2B, when the frequency of the sound signal is 800 Hz, the difference between the upper limit and the lower limit of the sound gain of the sound signal generated by the microphone apparatus 100 at different sound-receiving angles is less than a predetermined value (e.g., approximate to 6 dB). Thus, the sound gain of the sound signal generated by the microphone apparatus 100 after processing the speech signal can be considered to be substantially equal at different sound-receiving angles.

As depicted in FIG. 2C, when the frequency of the sound signal is 4000 Hz, the sound gain at the sound-receiving angles of 0 and 180 degrees is slightly greater than 0 dB, and the sound gain at the sound-receiving angles of plus and minus 90 degrees can be raised to approximately −5 dB. Referring to FIG. 5C again, the sound signal generated by the conventional linear microphone arrays with equal intervals will have severe attenuation of the sound gain at the sound-receiving angles of plus or minus 90 degrees, for example, up to −50 dB. Specifically, as shown by curve 262 in FIG. 2C, when the frequency of the sound signal is 4000 Hz, the difference between the upper limit and the lower limit of the sound gain of the sound signal generated by the microphone apparatus 100 at different sound-receiving angles is less than a predetermined value (e.g., approximate to 6 dB). Thus, the sound gain of the sound signal generated by the microphone apparatus 100 after processing the speech signal can be considered to be substantially equal at different sound-receiving angles.

In addition, the sound signals of 800 Hz and 4000 Hz are used in the aforementioned embodiment as an example, and the curves of the polar-pattern diagrams except for those in FIGS. 2B and 2C are similar, and the curves in the polar-pattern diagrams of the sound signals at other frequencies are also similar to the curves in the polar-pattern diagrams shown in FIGS. 2B and 2C. That is, the sound gain of the processed sound signal generated by the microphone apparatus 100 at each sound-receiving angle of each frequency (e.g., including high frequencies and low frequencies) can be substantially equal. Accordingly, when the user moves his or her position (i.e., the sound-receiving angle changes), the microphone apparatus 100 can still provide good sound-collecting quality.

Figure 3A:
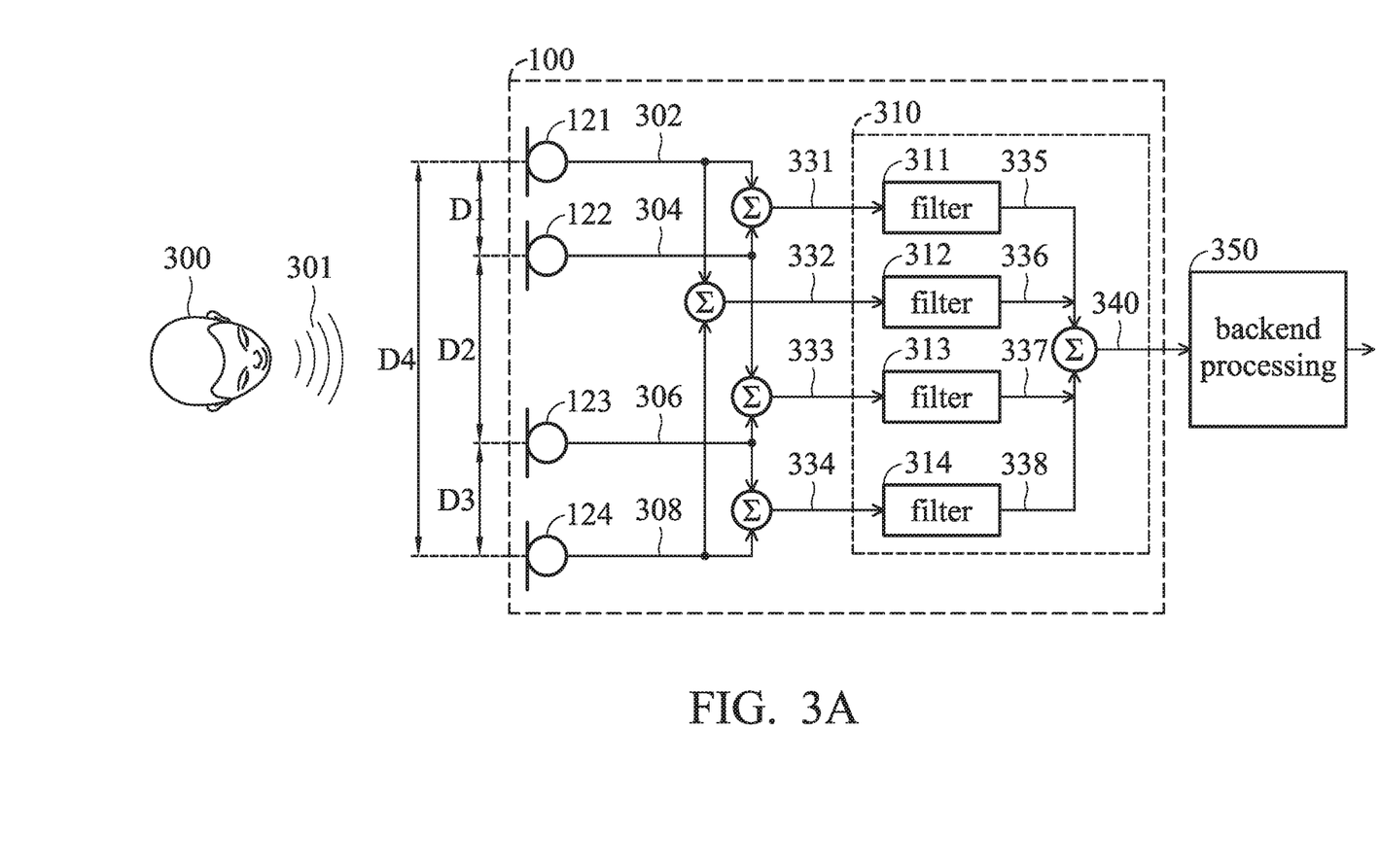
FIG. 3A is a diagram of the audio-processing procedure performed by the microphone arrays in accordance with another embodiment of the disclosure.

FIG. 3A is a diagram of the audio-processing procedure performed by the microphone arrays in accordance with another embodiment of the disclosure. Please refer to FIG. 1 and FIG. 3A.

In another embodiment, the microphone array 120 includes four microphones such as microphones 121~124. The arrangement of the microphones 121~124 is similar to that described in the embodiment of FIG. 2A, and the microphones 121~124 are arranged in a straight line with a non-uniform configuration. For example, the microphone distance between the microphones 121 and 122 is D1, and the microphone distance between the microphones 122 and 123 is D2, and the microphone distance between the microphones 123 and 124 is D3, and the microphone distance between the microphones 121 and 124 is D4. The microphone distance D1 is not equal to the microphone distance D2, and the microphone distance D2 is not equal to the microphone distance D3, as depicted in FIG. 3A.

In some embodiments, the relationship between the microphone distances D1~D4 is D4>D2>D3>D1. In some other embodiments, the relationship between the microphone distances D1~D4 is D4>D2>D3=D1, where the microphone distances D1~D4 may be 3 cm, 4.5 cm, 3 cm, and 10.5 cm, respectively, but the disclosure is not limited thereto. It should be noted that the microphone distances D1~D4 can be specifically designed for the use of the microphone apparatus 100 or audio processing.

Figure 3B:
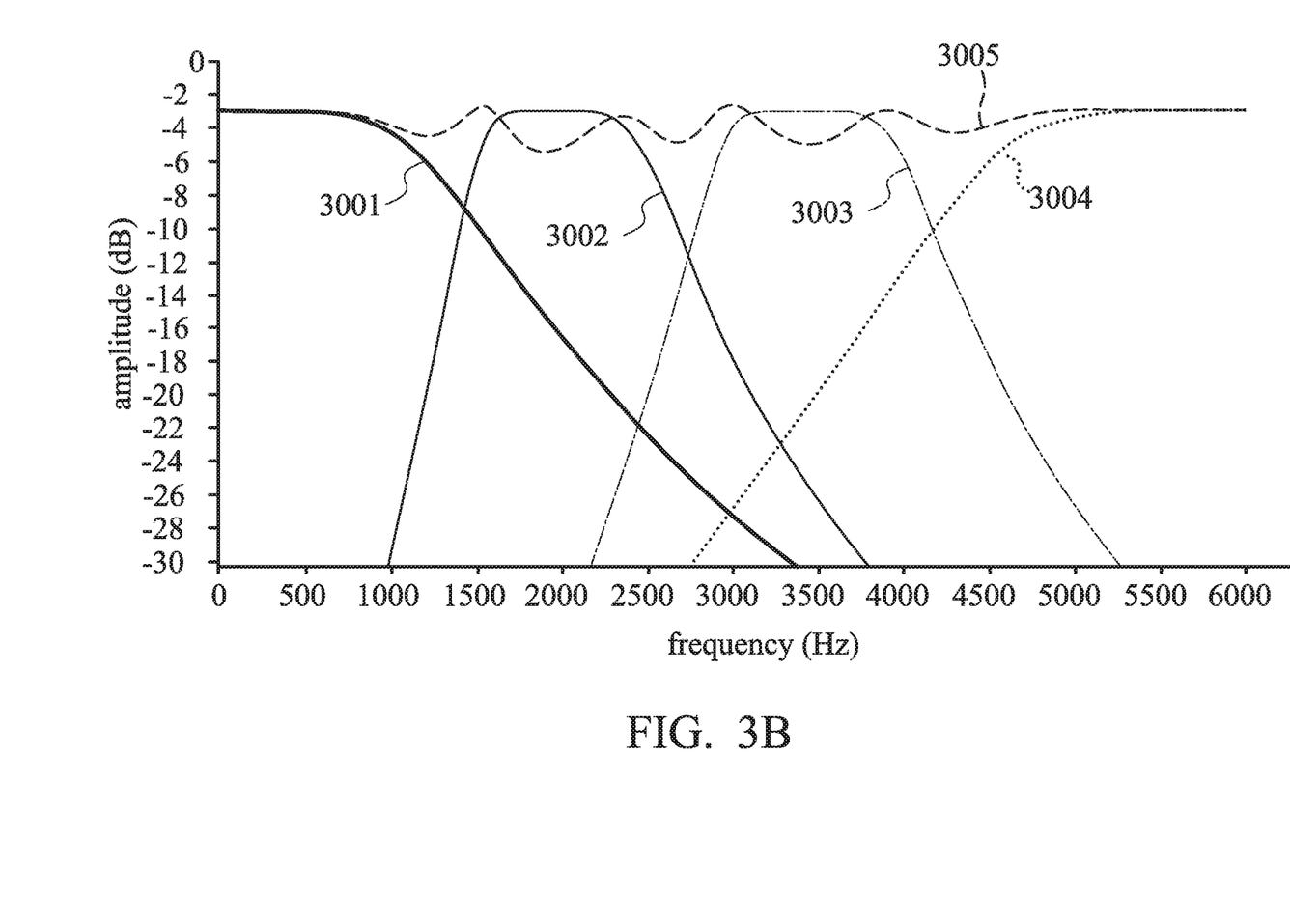
FIG. 3B is a diagram of the frequency response of different microphone arrays in accordance with the embodiment of FIG. 3A of the disclosure.

FIG. 3B is a diagram of the frequency response of different microphone arrays in accordance with the embodiment of FIG. 3A of the disclosure.

Any two of microphones 121~124 can also constitute a form array. The audio-processing stage 310 in FIG. 3A may use four different combinations of microphone pairs, such as microphones 121 and 122, microphones 121 and 124, microphones 122 and 123, and microphones 123 and 124. Since the microphone distance D4 between the microphones 121 and 124 is the longest, the sound signal 332 obtained by merging the sound signal 302 generated by the microphone 121 and the sound signal 308 generated by the microphone 124 will be transmitted to the filter 312 such as a low-pass filter. Since the microphone distance D1 between the microphones 121 and 122 is the shortest, the sound signal 331 obtained by merging the sound signal 302 generated by the microphone 121 and the sound signal 304 generated by the microphone 122 will be transmitted to a filter 311 such as a high-pass filter. In addition, the sound signals 333 and 334 obtained from the remaining microphone pairs such as the combinations of microphones 121 and 123 and microphones 123 and 124 will be respectively transmitted to the filters 313 and 314, which may be band-pass filters.

After being appropriately designed, the frequency-response ranges of filters 311~314 may correspond to different frequency bands that do not overlap each other. For example, filter 312 is a low-pass filter that has a frequency response as shown by curve 3001 and has a cut-off frequency of approximately 1200 Hz; filter 313 is a band-pass filter that has a frequency response shown by curve 3002 and has a high cut-off frequency of 2500 Hz and a low cut-off frequency of 1200 Hz; filter 314 is a band-pass filter that has a frequency response as shown by curve 3003 and has a high cut-off frequency of 4000 Hz and a low cut-off frequency of 2900 Hz; and filter 315 is a high-pass filter that has a frequency response shown by curve 3004 and has a cut-off frequency of 4500 Hz. Accordingly, the overall frequency response of filters 311~314 can be expressed by curve 3005, as depicted in FIG. 3B. As shown by curve 3005 in FIG. 3B, the sound gain of the amplitude of the sound signal 340 output from the microphone apparatus 100 at different frequencies within the frequency range of 0 to 6000 Hz may be between −2 dB and −5 dB. It indicates that the difference between the upper limit and the lower limit of the sound gain of the sound signal 340 output from the microphone apparatus 100 at different frequencies is less than a predetermined value (e.g., approximate to 6 dB). The disclosure is not limited to the filter design with the aforementioned configuration, and a person having ordinary skill in the art may adjust the cut-off frequency of each filter according to practical requirements.

In the embodiment of FIG. 3A, if the sound signal output from the microphone apparatus 100 is analyzed, a polar-pattern diagram similar to those shown in FIGS. 2B and 2C can be obtained. That is, the sound gains of the processed sound signal generated by the microphone apparatus 100 at each sound-receiving angle at high frequencies and low frequencies are substantially uniform. Accordingly, if the user moves his or her position (i.e., the sound-receiving angle changes), the microphone apparatus 100 can still provide a good sound-collecting quality.

Figure 3C:
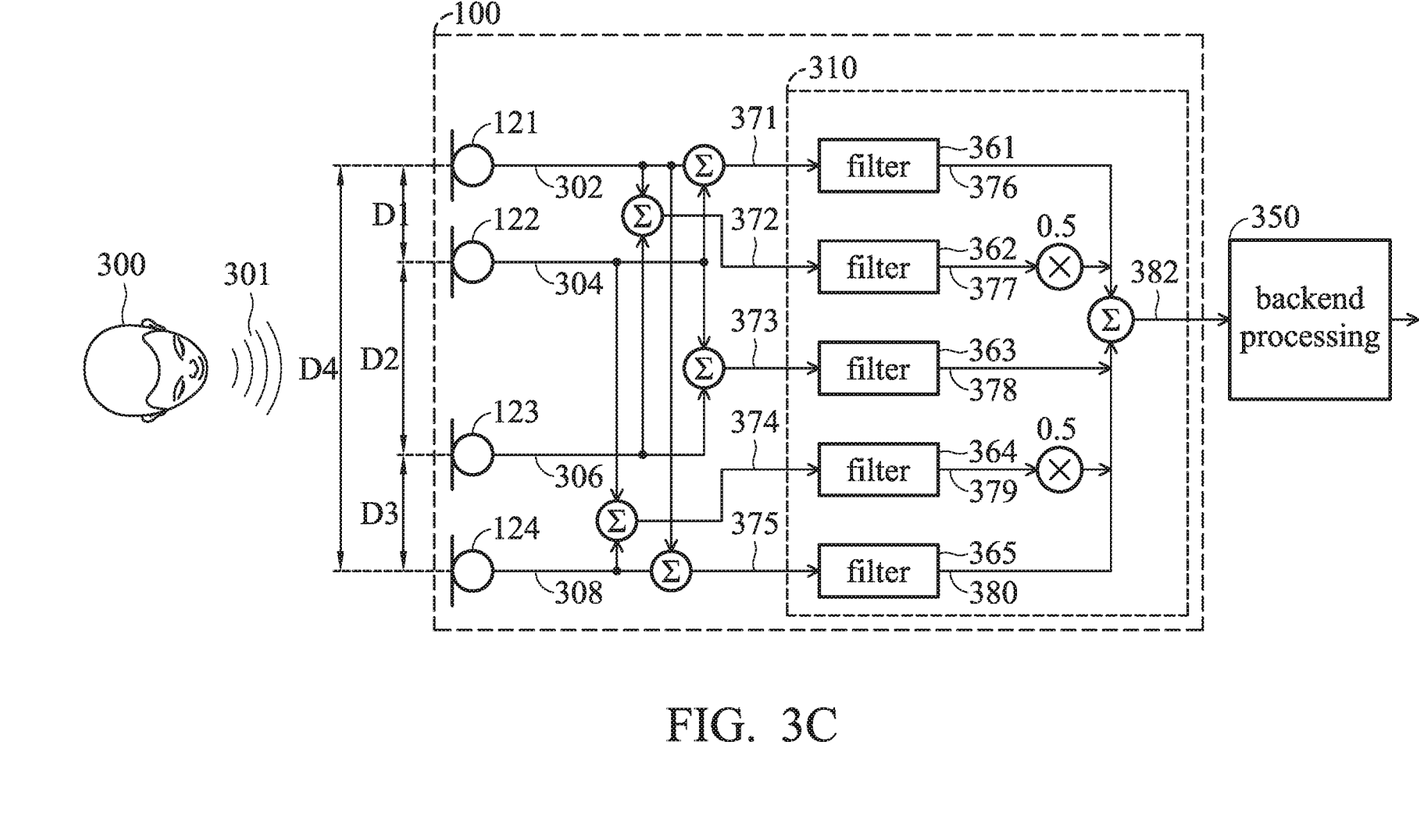
FIG. 3C is a diagram of the frequency response of different microphone arrays in accordance with yet another embodiment of the disclosure.

FIG. 3C is a diagram of the frequency response of different microphone arrays in accordance with yet another embodiment of the disclosure. The arrangement of the microphones 121~124 in the embodiment of FIG. 3C is similar to that in FIG. 3A, and the difference between FIG. 3A and FIG. 3C is that five different combinations of microphones are used in the audio-processing stage 360 in FIG. 3C. For example, in the embodiment of FIG. 3C, the sound signals 371, 373, and 375 that are obtained by merging the sound signals received by the combinations of microphones 121 and 122, microphones 122 and 123, and microphones 121 and 124, are similar to the sound signals 331, 333, and 332 in FIG. 3A, and the filters 361, 363, 365 are similar to the filters 311, 313, and 314 in FIG. 3A, respectively.

In addition, since the microphone distance between microphones 122 and 124 and the microphone distance between microphones 121 and 123 are both equal to 3+4.5=7.5 cm, the sound signals 335 and 336 that are obtained from the combinations of microphones 121 and 123, and microphones 122 and 124 are respectively transmitted to the filters 362 and 364, where the filters 362 and 364 are both band-pass filters and, the frequency bands corresponding to the filters 362 and 364 overlap with each other. The sound signals 377 and 379 generated by the filters 362 and 364 are respectively divided by the number of microphone pairs (e.g., a predetermined number) that have repeated microphone distances, and the divided sound signals 377 and 379 are merged with the sound signals 376, 378, and 380 generated by other filters 361, 363, and 365 to obtain the sound signal 382, and the sound signal 382 is transmitted to the backend processing 350.

In the embodiment, since the microphone distance between the microphones 123 and 124 is the shortest, the corresponding 361 can be implemented by a band-pass filter or a high-pass filter (e.g., with a cut-off frequency of 4500 Hz). If the filter 361 is implemented by a band-pass filter, its low and high cut-off may correspond to the upper limit of the frequency that can be perceived by the human ear, but the disclosure is not limited thereto. If the filter 361 is implemented by a high-pass filter, its design is similar to the filter 311 in FIG. 3A, for example, with a cut-off frequency of 4500 Hz. It should be noted that the filters 361~365 in FIG. 3C are also time-domain filters, so that the amount of calculations can be significantly reduced.

Figure 4A:
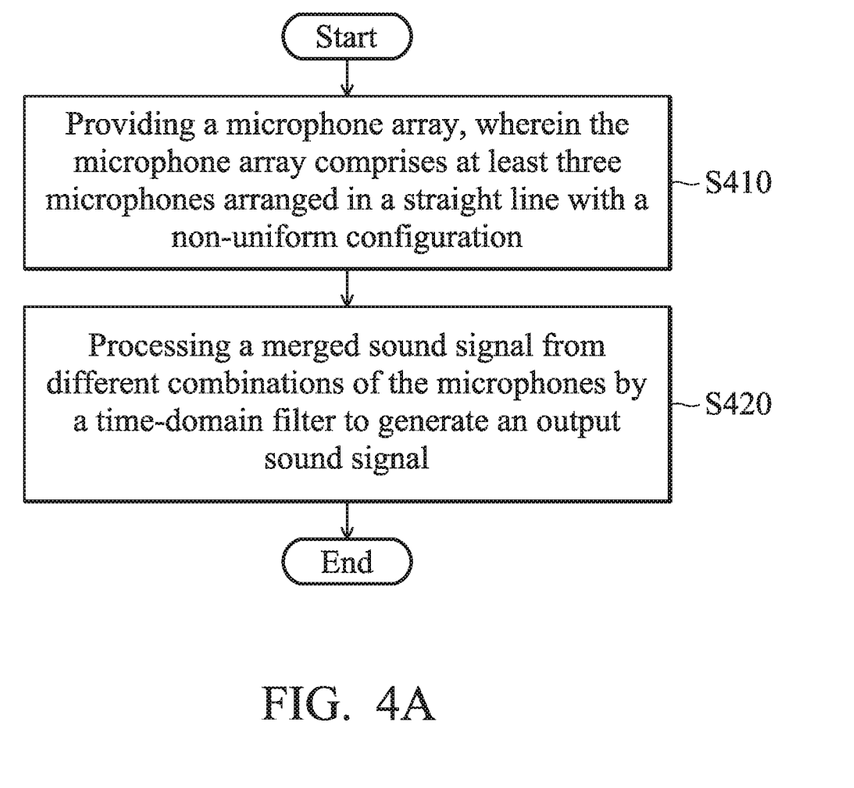
FIG. 4A is a flow chart of a method of processing a sound signal in accordance with an embodiment of the disclosure.

FIG. 4A is a flow chart of a method of processing a sound signal in accordance with an embodiment of the disclosure. Please refer to FIG. 1 and FIG. 4A.

In step S410, a microphone array is provided, wherein the microphone array includes at least three microphones arranged in a straight line with a non-uniform configuration, and the at least three microphones include a plurality of microphone pairs. In some embodiments, the microphone distance corresponding to each microphone is not repeated, as described in the embodiment of FIG. 2A. In some other embodiments, the microphone distances corresponding to a portion of the microphones are the same, as described in the embodiments of FIG. 3A and FIG. 3C.

In step S420, merged sound signals from different combinations of microphones are processed by a time-domain filtering process to generate an output sound signal. The detailed procedure of step S420 may include steps S422 to S426, the details of which can be found in FIG. 4B.

Figure 4B:
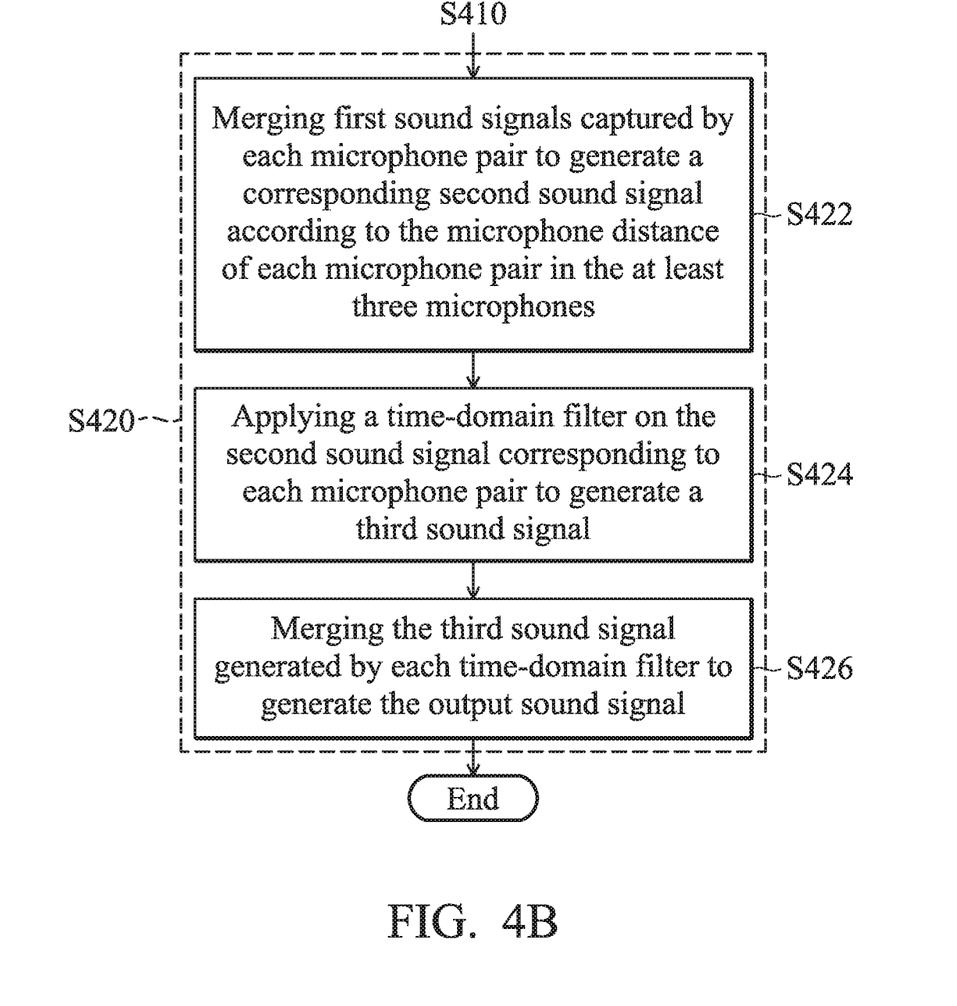
FIG. 4B is a flow chart of step S420 in the embodiment of FIG. 4A of the disclosure.

FIG. 4B is a flow chart of step S420 in the embodiment of FIG. 4A of the disclosure. Please refer to FIG. 1 and FIGS. 4A~4B. Step 420 in FIG. 4A may include steps S422, S424, and S426 in FIG. 4B.

In step S422, first sound signals captured by each microphone pair are merged to generate a corresponding second sound signal according to the microphone distance of each microphone pair in the at least three microphones. For example, each microphone includes two microphones, and the first sound signals captured by these two microphone are merged to generate the second sound signal.

In step S424, a time-domain filter is applied on the second sound signal corresponding to each microphone pair to generate a third sound signal, wherein the third sound signal corresponding to each microphone corresponds to a frequency band. In some embodiments, if the microphone distances of the respective microphone pair are not repeated, the frequency band corresponding to each time-domain filter does not overlap the others. In some other embodiments, a predetermined number of third microphone pairs among the remaining microphone pairs have the same microphone distance, as described in the embodiment of FIG. 3C, the frequency band corresponding to the time-domain filter of each third microphone pair overlaps the others. Thus, when merging the sound signals to generate the output sound signal, the integrated circuit 110 may divide the second sound signal generated by the time-domain filter corresponding to each third microphone pair by the predetermined number, as shown in FIG. 3C.

In step S426, the third sound signal generated by each time-domain filter is merged to generate the output sound signal, wherein the output sound signal is a time-domain sound signal, and the sound gains of the output sound signal at each sound-receiving angle of each frequency are substantially uniform, as shown in FIGS. 3B and 3C.

In view of the above, a microphone apparatus and a method of processing a sound signal are provided in the disclosure. The microphone apparatus includes at least three microphones arranged in a straight line with a non-uniform configuration, and the microphone apparatus uses time-domain filters to perform filtering processes on the merged sound signal from each microphone pair in the at least three microphones, so that the sound gain of the output sound signal of the microphone apparatus at different sound-receiving angles of each frequency can be substantially uniform. When the user moves his or her position (i.e., the sound-receiving angle changes), the microphone apparatus can still provide good sound-collecting quality, thereby improving the user's experience.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microphone apparatus, comprising:
   a microphone array, comprising at least three microphones arranged in a straight line with a non-uniform configuration; and
   an integrated circuit, electrically connected to the microphone array, wherein the integrated circuit is configured to process a merged sound signal from different combinations of the microphones using a time-domain filter to generate an output sound signal,
   wherein the output sound signal is a time-domain sound signal, and a sound gain of the output sound signal at each sound-receiving angle of each frequency is substantially uniform,
   wherein the output sound signal is omni-directional.

2. The microphone apparatus as claimed in claim 1, wherein the microphones comprise a first microphone, a second microphone, and a third microphone that are arranged in order, and the time-domain filter corresponding to the first microphone and the second microphone that have a shortest microphone distance is a high-pass filter, and the time-domain filter corresponding to the first microphone and the third microphone that have a longest microphone distance is a low-pass filter,
   wherein the time-domain filter corresponding to a combination of the second microphone and the third microphone is a band-pass filter.

3. The microphone apparatus as claimed in claim 2, wherein a frequency band of each time-domain filter corresponding to a respective combination of the microphones does not overlap any others.

4. The microphone apparatus as claimed in claim 2, wherein a first predetermined number of first combinations among different combinations of the microphones have the same microphone distance.

5. The microphone apparatus as claimed in claim 4, wherein the frequency band corresponding to the time-domain filter in each first combination overlaps the others, and the integrated circuit divides, by the predetermined number, a first sound signal generated by the time-domain filter corresponding to each first combination, and merges the divided first sound signal with a second sound signal from each of the other time-domain filters to generate the output sound signal.

6. The microphone apparatus as claimed in claim 1, wherein the integrated circuit transmits the output sound signal to a backend processing apparatus, and the backend processing apparatus performs a fast Fourier transform (FFT) on the output sound signal to obtain a frequency-domain sound signal for speech recognition.

7. A method of processing a sound signal, comprising:
   providing a microphone array, wherein the microphone array comprises at least three microphones arranged in a straight line with a non-uniform configuration; and
   processing a merged sound signal from different combinations of the microphones using a time-domain filter to generate an output sound signal, wherein the output sound signal is a time-domain sound signal, and a sound gain of the output sound signal at each sound-receiving angle of each frequency is substantially uniform,
   wherein the output sound signal is omni-directional.

8. The method as claimed in claim 7, wherein the microphones comprise a first microphone, a second microphone, and a third microphone that are arranged in order, and the time-domain filter corresponding to the first microphone and the second microphone that have a shortest microphone distance is a high-pass filter, and the time-domain filter corresponding to the first microphone and the third microphone that have a longest microphone distance is a low-pass filter,
   wherein the time-domain filter corresponding to a combination of the second microphone and the third microphone is a band-pass filter,
   wherein a frequency band of each time-domain filter corresponding to a respective combination of the microphones does not overlap the others.

9. The method as claimed in claim 7, wherein a first predetermined number of first combinations among different combinations of the microphones have the same microphone distance, and the frequency band corresponding to the time-domain filter in each first combination overlaps the others, and the method further comprises:
   dividing, by the predetermined number, a first sound signal generated by the time-domain filter corresponding to each first combination, and merging the divided first sound signal with a second sound signal from each of the other time-domain filters to generate the output sound signal.

10. The method as claimed in claim 7, further comprising:
    transmitting the output sound signal to a backend processing apparatus; and
    utilizing the backend processing apparatus to perform a fast Fourier transform (FFT) on the output sound signal to obtain a frequency-domain sound signal for speech recognition.

11. An electronic device, comprising:
    a microphone apparatus, comprising:
    a microphone array, comprising at least three microphones arranged in a straight line with a non-uniform configuration; and
    an integrated circuit, electrically connected to the microphone array, wherein the integrated circuit is configured to process a merged sound signal from different combinations of the microphones using a time-domain filter to generate an output sound signal, wherein the output sound signal is a time-domain sound signal, and a sound gain of the output sound signal at each sound-receiving angle of each frequency is substantially uniform, wherein the output sound signal is omni-directional; and
    a processor, electrically connected to the microphone apparatus, configured to perform a fast Fourier transform (FFT) on the output sound signal to obtain a frequency-domain sound signal for speech recognition.

* * * * *